(12) United States Patent
Brenguier et al.

(10) Patent No.: US 12,308,633 B2
(45) Date of Patent: May 20, 2025

(54) ELECTRIC SWITCHING DEVICE AND ASSOCIATED SWITCHING SYSTEM AND METHOD

(71) Applicant: Schneider Electric Industries SAS, Rueil Malmaison (FR)

(72) Inventors: Jérôme Brenguier, L'Albenc (FR); Eric Domejean, Voreppe (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 196 days.

(21) Appl. No.: 17/960,312

(22) Filed: Oct. 5, 2022

(65) Prior Publication Data
US 2023/0118434 A1    Apr. 20, 2023

(30) Foreign Application Priority Data

Oct. 15, 2021    (EP) .................................... 21306452

(51) Int. Cl.
    *H02H 3/16*    (2006.01)
    *H02H 1/00*    (2006.01)
(52) U.S. Cl.
    CPC ............ *H02H 3/16* (2013.01); *H02H 1/0015* (2013.01)
(58) Field of Classification Search
    CPC ........ H02H 3/16; H02H 1/0015; H01H 9/548; H01H 9/547
    USPC .......................................................... 361/13
    See application file for complete search history.

(56) References Cited

U.S. PATENT DOCUMENTS

| | | | | |
|---|---|---|---|---|
| 5,751,524 | A * | 5/1998 | Swindler .................. | H02H 7/22 361/115 |
| 6,222,433 | B1 * | 4/2001 | Ramakrishnan ..... | H01H 71/505 335/35 |
| 11,563,319 | B1 * | 1/2023 | Cignoli ..................... | G05F 1/56 |
| 2006/0238936 | A1 * | 10/2006 | Blanchard .............. | H01H 9/547 361/56 |
| 2014/0177120 | A1 * | 6/2014 | Zhang ...................... | H02H 3/08 361/93.9 |
| 2016/0005725 | A1 | 1/2016 | Ikeda | |
| 2017/0170824 | A1 * | 6/2017 | Du ......................... | H01H 9/547 |

(Continued)

OTHER PUBLICATIONS

C. Keimel, G. Claydon, B. Li, J. Park and M. E. Valdes, "Micro-Electromechanical-System (MEMS) based switches for power applications," 2011 IEEE Industrial and Commercial Power Systems Technical Conference, Newport Beach, CA, USA, 2011, pp. 1-8, doi: 10.1109/ICPS.2011.5890885 (Year: 2011).*

(Continued)

*Primary Examiner* — Thienvu V Tran
*Assistant Examiner* — Sreeya Sreevatsa
(74) *Attorney, Agent, or Firm* — Troutman Pepper Locke LLP

(57) ABSTRACT

An electrical protection device capable of operating without auxiliary electrical power supply includes a control module configured to detect an electrical fault and a switching module, a first circuit including at least two normally-on JFET transistors and a switching member including a first contact. The switching module is configured so that, upon a switchover of the first contact when the current circuits, an electric arc is formed and so that the appearance of the electric arc generates an electrical signal transmitted to at least one of the transistors, the electrical signal driving the switching of the transistor.

13 Claims, 7 Drawing Sheets

(56) References Cited

U.S. PATENT DOCUMENTS

2021/0210946 A1* 7/2021 Li ........................ H02H 3/33

OTHER PUBLICATIONS

Horace G. Jackson, 19—Transistor Circuits, Editor(s): Wendy M. Middleton, Mac E. Van Valkenburg, Reference Data for Engineers (Ninth Edition), Newnes, 2002, pp. 19-1-19-30, ISBN 9780750672917, https://doi.org/10.1016/B978-075067291-7/50021-2 (Year: 2002).*
European Search Report and Search Opinion dated Apr. 26, 2022 for corresponding European Patent Application No. 21306452.0, 9 pages.

* cited by examiner

ELECTRIC SWITCHING DEVICE AND ASSOCIATED SWITCHING SYSTEM AND METHOD

TECHNICAL FIELD

The present invention relates to an electric switching device. The present invention also relates to an associated switching system and an associated method for switching a current.

BACKGROUND

Switching devices such as circuit breakers are commonly used to detect electrical faults linked to one or more electric currents and to interrupt the one or more currents in the event of a fault being detected. To this end, the circuit breakers are equipped with means for detecting an electrical fault, these means actuating a switching member that switches the current when necessary.

The switching member is traditionally formed by an electrically conductive contact able to move between two positions, one in which it electrically connects two terminals between which it channels the current, and the other in which the contact is spaced from at least one of the terminals. Such members furthermore have the benefit of galvanically isolating their two terminals from one another when the contact is in the second position, and thus of offering a very high level of protection, all the more so when their actuation mechanism keeps them in the second position by default.

However, mobile switching members of the abovementioned type remain relatively slow since the switching generally requires one to several milliseconds. Furthermore, an electric arc generally appears between the mobile contact and the one or more terminals from which it moves away during switching. Such an electric arc requires a specific configuration of the switching member in order to be extinguished safely, via a complex and large arc extinguishing chamber, and furthermore generates wear on the elements between which it forms, thereby limiting the lifetime of the switching device.

It has therefore been proposed, instead of the mobile contact, to use one or more electronically controlled transistors. To ensure sufficient protection, the transistors that are used are necessarily of a "normally-off" type, that is to say of a type that requires a positive action (receipt of a command on the gate of the transistor) to allow current to flow, and that blocks the flow of current in the absence of such an action. For example, MOSFET transistors or insulated-gate bipolar transistors (IGBTs) have been proposed for such use.

However, normally-off transistors have a relatively high resistance to the flow of current, in particular when they are dimensioned to switch a high current. It is therefore necessary to provide a large number of transistors in parallel in order to limit losses by dividing the current so as to allow less strict dimensioning of the transistors. Such a configuration is complex and bulky. In addition, these transistors need to be supplied with electrical power through a voltage, which is generally present on the network, or by way of an auxiliary power supply so that the current is able to flow.

There is therefore a need for an electrical protection device that has small dimensions and a low electrical resistance while still allowing faster switching of the current and while having a longer lifetime than the switching devices from the prior art, and that does not need to be supplied with electrical power by a dedicated electrical power supply.

SUMMARY

To this end, what is proposed is an electrical protection device comprising an input, an output, a control module and a switching module capable of channelling an electric current between the input and the output, the switching module comprising a first electrical circuit connecting the input to the output, the control module being configured to detect an electrical fault and to generate a first switching signal in the event of a fault being detected, the first circuit comprising, connected in series between the input and the output, at least two head-to-tail normally-on JFET transistors and a switching member comprising a first terminal, a second terminal, a first actuator and a first contact, the first actuator being configured to move the first contact between a first position and a second position in response to the first switching signal, the first contact channelling the current between the first terminal and the second terminal when the first contact is in the first position, the first contact being spaced from at least one of the first and second terminals when the first contact is in the second position, the switching module being configured so that, upon a switchover of the first contact from the first to the second position when the current flows between the first terminal and the second terminal, an electric arc is formed between the first contact and the second terminal, and so that the appearance of the electric arc generates an electrical signal transmitted to at least one of the transistors, the electrical signal driving the switching of said transistor, the protection device being capable of operating without auxiliary electrical power supply, by drawing some of the electrical energy from the electric arc that appears across the terminals of the switching member.

By virtue of the invention, it is possible to use normally-on JFET transistors (which therefore have low resistance) even in the absence of any control device supplied with electrical power to command the opening of the JFETs, since this opening is caused by the electric arc that appears across the terminals of the switching member. Furthermore, the electric arc is switched very quickly before it is able to develop through the action of the JFETs, thereby therefore making it possible to use a switching member that is not specially designed to withstand such an electric arc and not comprising for example an arc extinguishing chamber. The early extinguishing of the arc also limits the wear on the switching member.

According to some advantageous but non-obligatory embodiments, the switching device has one or more of the following features, taken on their own or in any technically possible combination:

each transistor comprises a source, a drain and a gate, the electrical signal being a voltage between the gate and the source of said transistor, the voltage being such that a conductive channel between the source and the drain of the transistor is pinched under the effect of the voltage;

the source of each transistor is connected to a respective terminal from among the first terminal and the second terminal, the switching module comprises, for each transistor, a second electrical circuit configured to electrically connect the gate of the transistor under consideration to the other terminal from among the first and the second terminal of the switching member so as to generate a voltage between the gate and the source of the transistor under consideration in the event of an electric arc;

each second circuit comprises a first ohmic conductor and a diode having a cathode and an anode, the first ohmic conductor being connected in series between the cathode and the terminal to which the second circuit is configured to connect the gate, the anode being connected to the gate of the corresponding transistor;

each second electrical circuit furthermore comprises a Zener diode and a second ohmic conductor that are connected in parallel between the gate and the source of the corresponding transistor;

the protection device comprises a member able to be actuated by an operator, in particular a rotary lever, so as to command switching of the first contact between the first and the second position;

the first switching signal is an electrical signal;

the control module comprises a magnetothermal detection module configured to detect a fault and to command the generation of each switching signal in response to the detection;

the first circuit furthermore comprises a disconnector connected in series with the transistors and with the switching member, the disconnector comprising a third terminal, a fourth terminal, a second contact, a second actuator, the second contact being able to move between a third position and a fourth position, the second contact channelling the current between the third terminal and the fourth terminal when the second contact is in the third position, the second contact being spaced from at least one of the third and fourth terminals when the second contact is in the fourth position, the second actuator being configured to move the second contact between the third position and the fourth position in response to a second switching signal generated by the control module in the event of a fault being detected;

the protection device comprises a member able to be actuated by an operator, in particular a rotary lever, so as to command switching of the second contact between the third position and the fourth position;

the control module is configured, in the event of a fault being detected, to generate at least one third electrical switching signal able to drive switching of a corresponding transistor;

the control module comprises a power supply configured, based on the current flowing between the input and the output, to generate an electrical supply current for a generation module, the generation module being configured, in the event of a fault being detected, to generate at least the third electrical switching signal;

the protection device is capable of drawing some of the electrical energy from the electric arc that appears across the terminals of the switching member to control the first electrical circuit and therefore switch the JFET transistors;

the protection device comprises an auxiliary control circuit supplied with power by a power supply that is configured to draw some of the energy from the electric current flowing between the input and the output, the auxiliary control circuit being configured, in the event of a short-circuit fault with the energy taken from the power supply being detected, to generate a fourth signal able to drive switching of the transistors;

the power supply of the auxiliary control circuit comprises a current transformer.

What is also proposed is a switching system configured to transmit a plurality of currents between respective inputs and outputs, to detect an electrical fault relating to at least one of said currents, and to interrupt at least the corresponding current in the event of an electrical fault being detected, comprising a plurality of switching devices as defined above.

What is also proposed is a switching system configured to transmit a plurality of currents between respective inputs and outputs, to detect an electrical fault based on measurements of parameters of at least one current, and to interrupt at least the corresponding current in the event of an electrical fault being detected, comprising a plurality of switching devices as described above.

What is also proposed is a method for switching an electrical protection device comprising an input, an output, a control module and a switching module capable of channelling an electric current between the input and the output, the switching module comprising a first electrical circuit connecting the input to the output, the control module being configured to detect an electrical fault and to generate a first switching signal in the event of a fault being detected, the first circuit comprising, connected in series between the input and the output, at least two head-to-tail normally-on JFET transistors and a switching member comprising a first terminal, a second terminal, a first actuator and a first contact, the first actuator being configured to move the first contact between a first position and a second position in response to the first switching signal, the first contact channelling the current between the first terminal and the second terminal when the first contact is in the first position, the first contact being spaced from at least one of the first and second terminals when the first contact is in the second position, the protection device being capable of operating without auxiliary electrical power supply, by drawing some of the electrical energy from the electric arc that appears across the terminals of the switching member, the method comprising, in the switching module, steps of:
switching the first contact from the first to the second position when the current flows between the first terminal and the second terminal,
the appearance of an electric arc between the first contact and the second terminal,
generating, using the electric arc, an electrical signal that is transmitted to at least one of the transistors, and
switching at least said transistor in response to the receipt of the electrical signal.

BRIEF DESCRIPTION OF THE DRAWINGS

Features and advantages of the invention will become apparent upon reading the following description, given solely by way of non-limiting example and with reference to the appended drawings, in which.

DETAILED DESCRIPTION

Figure 1:
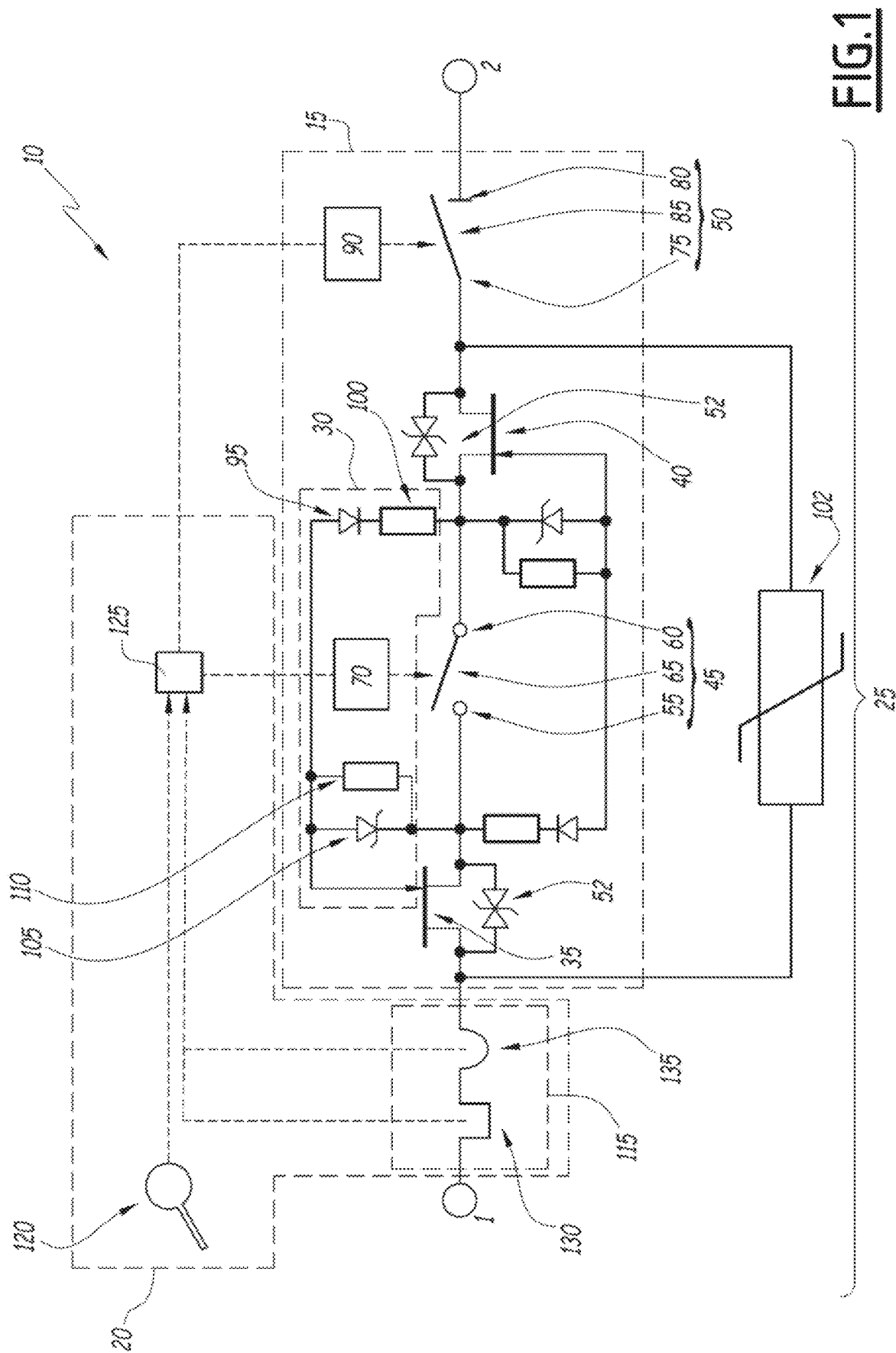
FIG. 1 is a schematic depiction of a first example of a switching device according to the invention.

A first example of a switching device 10 is shown in FIG. 1.

The switching device 10 is for example integrated into a switching system comprising a plurality of such switching devices 10.

The switching device 10 comprises an input 1, an output 2, a switching module 15 and a control module 20.

The switching device 10 is configured to receive a current on the input 1, to channel it to the output 2, and also to detect the occurrence of an electrical fault and to interrupt the current between the input 1 and the output 2 following the detection of said electrical fault.

Each electrical fault is for example an excessive strength of the current, a short circuit, an overvoltage, or even an electric arc.

The switching device 10 may also be tripped by an external command, for example by way of a remote control.

The switching device 10 may also be tripped mechanically, for example by way of a control member, such as a lever, as will be seen in some exemplary embodiments illustrated below.

The input 1 and the output 2 are each configured to be connected to an electrical conductor through which current enters or leaves, for example to a conductive wire or cable, or else to an input or output terminal of another electrical device.

It should be noted that the terms "input" and "output" are arbitrary, and that the direction of the current flowing between the input 1 and the output 2 is liable to vary, for example if the current is an AC current, or else if the current is a DC current that changes direction when a battery charges and, alternately, discharges.

The switching module 15 is configured to channel the current between the input 1 and the output 2, and to interrupt the current following the receipt of a first switching signal issued by the control module 20.

The switching module 15 comprises a first electrical circuit 25 and at least one second electrical circuit 30, in particular two second circuits 30.

The first electrical circuit 25 connects the input 1 to the output 2.

The first electrical circuit 25 comprises, connected in series, at least two transistors 35 and 40 and a switching member 45. The circuit optionally furthermore comprises a disconnector 50.

The switching module 20 optionally furthermore comprises at least one limiter 52, in particular one limiter 52 for each transistor 35, 40. In many embodiments, the limiters 52 may be omitted.

Each transistor 35, 40 is a JFET transistor, preferably a JFET transistor made of silicon carbide (SiC).

The acronym JFET, standing for "junction field-effect transistor", denotes a field-effect transistor the gate of which is in direct contact with the semiconductor channel connecting the source and the drain, the channel being interposed between two semiconductor portions having a doping type different from that of the channel, such that modifying the potential of the gate (connected to one of these two portions) tends to increase the size of the depletion zone that appears at the junction between the channel and said portions. Thus, if the voltage is sufficient, the channel is completely depleted and made electrically insulating.

Each transistor 35, 40 is in particular an n-channel JFET.

Each transistor 35, 40 is normally on. In other words, each transistor 35, 40 is such that, in the absence of any action on the gate of the transistor 35, 40, the transistor 35, 40 allows a current to flow between the source and the drain.

The transistors 35, 40 are arranged head-to-tail in the electrical circuit, that is to say that the current flows from the source to the drain in one of the transistors 35, 40 and from the drain to the source in the other transistor 35, 40.

According to one embodiment, the sources of the two transistors 35, 40 are interposed between the drains of the two transistors 35, 40 along the path of the current.

In the exemplary switching device 10 in FIG. 1, the sources of the two transistors 35, 40 are each connected to the switching member 45.

The drain of the transistor 35 is connected to the input 1, for example by an electrical conductor or by part of the control module 20.

Optionally, the number of transistors 35, 40 is other than two, for example equal to four, six or any even number.

In this case, the transistors 35, 40 are distributed into two groups of transistors 35, 40, the transistors 35, 40 of each group being arranged in the same direction and connected successively in parallel.

Each transistor 35, 40 is for example made of silicon carbide SiC. As a variant, at least one transistor 35, 40, in particular each transistor 35, 40, is made of another semiconductor material, for example of gallium nitride GaN or even of silicon. The material that is used depends in particular on the voltages and the strengths of the currents that the switching device 10 is intended to withstand.

The switching member 45 comprises a first terminal 55 and a second terminal 60.

The first terminal 55 is for example connected to the transistor 35, in particular to the source of the transistor 35. The second terminal 60 is connected to the transistor 40, in particular to the source of the transistor 40.

The switching member 45 is configured to switch between a first configuration and a second configuration.

When the switching member 45 is in the first configuration (closed state), the switching member allows current to flow between the first terminal 55 and the second terminal 60.

When the switching member 45 is in the second configuration (open state), the switching member electrically isolates the first terminal 55 from the second terminal 60.

The switching member 45 is configured to switch between the first and the second configuration upon receipt of a first control signal from the control module 20.

The switching member 45 is configured to be in the first configuration by default. In other words, in the absence of any first control signal transmitted by the control module 20, the switching member 45 is in the first configuration.

According to the embodiment shown in FIG. 1, the switching member 45 is a relay comprising a first contact 65 and a first actuator 70.

The first contact 65 is electrically conductive and is able to move between a first position and a second position, shown in FIG. 1.

When the switching member 45 is in the first configuration, the first contact 65 is in the first position. When the switching member 45 is in the second configuration, the first contact 65 is in the second position.

When the first contact 65 is in the first position, the first contact 65 electrically connects the two terminals 55 and 60, for example by bearing against the two terminals 55 and 60.

When the first contact 65 is in the second position, the first contact 65 is spaced from at least one of the terminals 55 and 60. The first contact 65 thus does not allow current to flow between the terminals 55 and 60.

Many types of mechanism, in particular rotary ones, are able to be used to ensure the mobility of and guide the first contact 65. It is also possible to use micromechanical relays (MEMS).

In a manner known per se, the switching member 45 is configured such that, when the first contact 65 moves from the first position to the second position while an electric current is flowing, an electric arc appears between the first contact 65 and the second terminal 60. For example, the two terminals 55, 60 and the first contact 65 are bathed in a gas able to allow the appearance of such an arc, in particular in air.

In practice, the switching member 45 is not capable of extinguishing the electric arc on its own, since it does not have an arc extinguishing chamber. It is the JFET transistors that will automatically interrupt the current, as explained below. The switching member 45 is mainly configured, upon the appearance of an electric arc, to generate a voltage between the terminals 55 and 60 so as to allow the JFET transistors to open.

The first actuator 70 is configured to move the first contact 65 between the first position and the second position following the receipt of a first control signal, in particular a first electrical or mechanical control signal, from the control module 20.

In particular, the first actuator 70 is configured to keep the first contact 65 in the first position in the absence of any first control signal, and to move the first contact 65 into the second position and keep it there when the first actuator 70 is supplied with the first control signal.

In many embodiments, the protection device "has its own current", that is to say that it is capable of operating without an auxiliary electrical power supply, by drawing the electrical energy needed for it to operate from the phase conductor (or, in the case of a multiphase installation, from one or more of the phase conductors) connected to the protection device.

In particular, in many embodiments, the protection device is configured to draw some of the electrical energy from the electric arc (that appears across the terminals of the switching member 45) to control the first electrical circuit and therefore switch the JFET transistors 35 and 40.

For this purpose, the protection device 10 comprises a module 125.

However, many types of first actuator 70 may be contemplated.

The disconnector 50 is interposed on the current path, for example between the switching member 45 and the output 2, this example not being limiting. The disconnector 50 comprises a third terminal 75, connected for example to the drain of the transistor 40, a fourth terminal 80 connected to the output 2, a second contact 85 and a second actuator 90.

The disconnector 50 makes it possible to ensure galvanic isolation, in particular due to the distance between its electrical contacts. However, in many embodiments, the disconnector 50 may be omitted.

The second contact 85 is electrically conductive and is able to move between a third position and a fourth position, shown in FIG. 1.

When the second contact 85 is in the third position, the second contact 85 electrically connects the two terminals 75 and 80, for example by bearing against the two terminals 75 and 80.

When the second contact 85 is in the fourth position, the second contact 85 is spaced from at least one of the terminals 75 and 80, in particular from the terminal 80. The second contact 85 thus does not allow current to flow between the terminals 75 and 80.

Preferably, the second contact 85 is spaced sufficiently from its terminal to ensure galvanic isolation. This distance may be chosen for example based on the calibre of the protection device.

Many types of mechanism, in particular rotary ones, are able to be used to ensure the mobility of and guide the second contact 85.

The second actuator 90 is configured to move the second contact 85 between the third position and the fourth position following the receipt of a second control signal, for example an electrical or mechanical one, from the control module 20.

In particular, the second actuator 90 is in this case a bistable actuator, configured to keep the disconnector 50 in the position that it occupies unless it receives a trip signal, in which case the disconnector 50 is switched into the corresponding position.

For example, the second actuator 90 is of a known type comprising a spring and an electromagnet, the spring tending to move the second contact 85 to its fourth position and the electromagnet being configured, when it is supplied with the second control signal, to directly or indirectly exert, on the second contact 85, a force that tends to move the second contact 85 to its third position. However, many types of second actuator 90 may be contemplated.

It should be noted that, although the actuators 70 and 90 have been described here as being separate actuators forming part of the switching module 15, these actuators may, as a variant, also be considered to form part of the control module 20 (in which case the control module is able to command the switching of the contacts 65 and 85 by applying a force to these contacts 65, 85).

As a variant or in addition, the actuators 70, 90 may be grouped into a single device to save on space.

Each limiter 52 is connected in parallel between the drain and the source of the corresponding transistor 35, 40. Each limiter 52 is configured to limit the voltage between the drain and the source to a predefined maximum value, that is to say to prevent this voltage from exceeding the maximum value.

As will become apparent hereinafter, the switching module 15 is configured so that the appearance of an electric arc between the first contact 65 and the second terminal 60 generates an electrical signal that is transmitted to at least one of the transistors 35, 40 and able to drive the switching of the transistor 35 or 40 under consideration.

This function is performed in the present case by the second circuits 30, but it should be noted that means other than these electrical circuits could be considered for commanding the switching of at least one of the transistors 35, 40.

Each second circuit 30 is associated with one of the transistors 35, 40.

Each second circuit 30 is configured to generate a respective electrical switching signal and transmit it to the corresponding transistor 35, 40 upon the appearance of the electric arc.

In particular, the second circuits 30 are configured so that, when an electric arc occurs, just one of the two circuits 30 generates the corresponding electrical signal and transmits it to the associated transistor 35, 40.

In particular, it is the direction of the current flowing between the input 1 and the output 2 that defines which of the two second circuits transmits the corresponding electrical signal.

Each electrical signal is in particular a voltage imposed between the source and the gate of the transistor 35, 40, the voltage being such that the conductive channel between the source and the drain of the transistor 35, 40 is pinched under the effect of the voltage.

Each second circuit 30 is for example configured to electrically connect the gate of the corresponding transistor 35, 40 to the one of the terminals 55, 60 that is not connected to the source of the transistor 35, 40 when the electric arc occurs and the current flows in the corresponding direction.

Since the appearance of the electric arc generates a voltage between the terminals 55 and 60, and since the source of each transistor 35, 40 is connected to a respective terminal 55, 60, connecting the gate of each transistor 35, 40 to the other terminal 55, 60 makes it possible to impose a voltage between the gate and the source of the transistor 35, 40 so as thus to bring about switching thereof.

Each second circuit 30 comprises for example a diode 95, a first ohmic conductor 100, a Zener diode 105 and a second ohmic conductor 110.

The diode 95 makes it possible to avoid sending a positive voltage to the gate of the JFET transistor (in line with the polarity of the electric arc generated by the switching member 45).

However, as a variant, the diode 95 may be omitted, for example if the JFET transistor that is used is capable of withstanding such a positive voltage.

It should be noted that other types of circuit 30 performing the same functions are also conceivable.

The diode 95 and the first ohmic conductor 100 are connected in series between the gate of the corresponding transistor 35, 40 and the terminal 55 or 60 that the circuit 30 is intended to connect to the gate.

In particular, the diode 95 has an anode and a cathode, the anode being connected to the gate and the first ohmic conductor 100 connecting the cathode to the corresponding terminal 55, 60.

The first ohmic conductor 100 has an electrical resistance of between for example 1 kiloohm and 10 kiloohms.

The Zener diode 105 and the second ohmic conductor 110 are connected in parallel between the gate and the source of the corresponding transistor 35, 40 to the circuit 30 under consideration. The voltage threshold (Zener voltage) of the Zener diode is for example between 9 volts and 15 volts.

In particular, the cathode of the Zener diode 105 is connected to the source and the anode of the Zener diode 105 is connected to the gate, the second ohmic conductor 110 being connected in parallel between the cathode and the anode of the Zener diode 105.

The second ohmic conductor 110 has an electrical resistance of between for example 10 kiloohms and 100 kiloohms.

The control module 20 is configured to detect an electrical fault relating to the current flowing between the input 1 and the output 2 and, in the event of such a fault being detected, to generate a first signal for switching the switching member 45, that is to say a signal that brings about the movement of the first contact 65 to the second position.

Optionally, the control module 20 is furthermore configured, following the detection of the fault, and preferably after a delay of a few milliseconds, to generate a second signal for switching the disconnector 50, that is to say a signal that brings about the movement of the second contact 85 to the second position.

The control module 20 comprises a detection module 115, a control member 120 and a generation module 125.

The detection module 115 is configured to detect the occurrence of an electrical fault and to inform the generation module 125 of this occurrence.

The detection module 115 is for example a magnetothermal detection module. In a manner known per se, such a detection module comprises a bimetal strip 130 and a coil 135.

The bimetal strip 130 is configured to be flowed through by the current flowing between the input 1 and the output 2. For example, the bimetal strip 130 forms part of the first circuit 25.

The bimetal strip 130 is configured to deform as a function of its temperature, and in particular so that, when the temperature of the bimetal strip 130 exceeds a predetermined threshold, the deformation of the bimetal strip 130 triggers a mechanism that acts on the generation module 125. Since the temperature of the bimetal strip 130 depends on the strength of the current flowing through it, such a bimetal strip 130 makes it possible to detect overcurrents that are small but the duration of which is relatively lengthy.

The coil 135 is also configured to be flowed through by the current. The coil 135 is configured to generate a magnetic field when the current flows through it, the magnetic field exerting a force on a mobile element, this force causing the mobile element to move when the strength of the current (and therefore that of the magnetic field) exceeds a certain threshold, the movement of the mobile element acting on the generation module 125 so as to signal the occurrence of an overcurrent. Such a coil 135 thus makes it possible to detect a very short but strong overcurrent.

It should be noted that the action of the bimetal strip 130 and/or of the coil 135 on the generation module 125 is able to be achieved in many ways, both mechanically and electrically.

Furthermore, fault detection means other than a bimetal strip 130 and a coil 135 may be used, for example current sensors and a controller that detects the fault based on measurements of the strength of the current.

The control member 120 is configured to be actuated by an operator so as to act on the generation module 125 such that the generation module 125, by way of the first actuator 70, moves the first contact 65 between its first and second positions.

As a variant, the control member 120 acts directly on the first actuator 70, without involving the generation module 125.

In a manner known per se, the control member 120 is for example a rotary lever, or else a button, able to be moved by the operator between two positions so as to command the movement of the second contact 85.

Optionally, the control member 120 is furthermore configured, when it is moved by an operator, to command, directly or via the generation module 125, switching of the second contact 85 between the third and the fourth position. The control member 120 is in particular configured to command the simultaneous opening of the two contacts 65, 85 or the simultaneous closure of the two contacts 65, 85.

In practice, the opening commanded by the control member 120 is staggered with a slight delay of the order of a few milliseconds so as to avoid the electric arc appearing across the terminals of the disconnector 50 rather than appearing across the terminals of the switching member 45.

The generation module 125 is configured, in the event of a fault being detected by the detection module 115, to command the switching of the first contact 65 to its second position via the issuing of the first switching signal.

The first switching signal is for example a mechanical signal, that is to say that the generation module 125 acts mechanically on the first actuator 70 so as to command the opening of the first contact 65.

As a variant, the first switching signal is an electrical signal intended for the first actuator 70.

The generation module 125 is optionally furthermore configured to command the switching of the second contact 85 to its fourth position, via the issuing of the second switching signal, in the event of a fault being detected.

Optionally but nevertheless advantageously, the protection device may comprise an element for protecting against overvoltages 102, such as a varistor (MOV, for "metal-oxide varistor") connected in parallel with the transistors 35, 40 and with the switching member 45. As a variant, a protection device such as a transient voltage suppressor (TVS) diode could be used.

Figure 2:
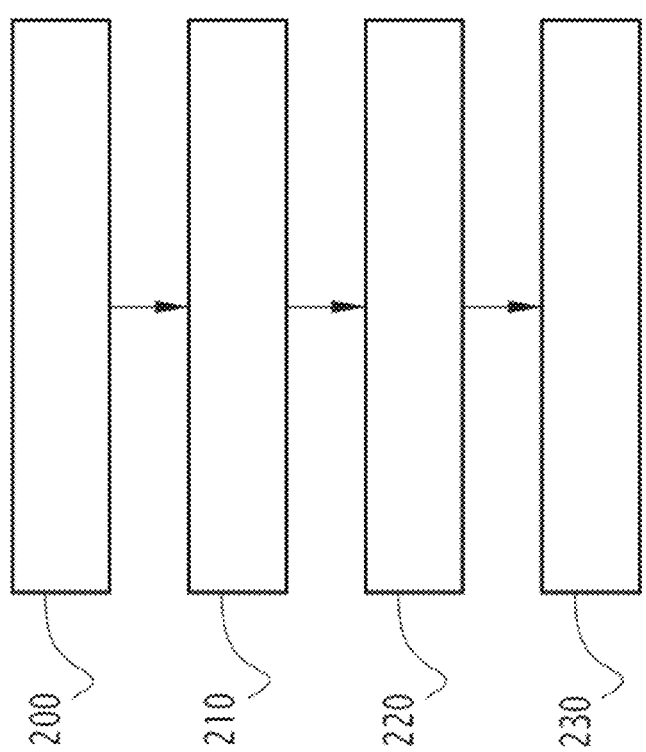
FIG. 2 is a flowchart of a switching method implemented by the switching device from FIG. 1.

The operation of the first exemplary switching device 10 will now be described with reference to FIG. 2, which shows a flowchart of the steps of one example of a switching method implemented by the switching device 10.

The method comprises a switching step 200, an appearance step 210, a generation step 220 and a switching step 230.

Prior to the switching step 200, current flows between the input 1 and the output 2. Thus, the first contact 65 is in its first position and the second contact 85 is in the third position.

In the switching step 200, the first contact 65 switches to its second position.

For example, an electrical fault is detected by the switching module 20, which transmits the first switching signal to the switching member 45 so as to bring about said switching.

Optionally, the second switching signal is also transmitted to the disconnector 50.

In the appearance step 210, an electric arc forms between the first contact 65 and the second terminal 60 during the movement of the first contact 65.

The appearance of the electric arc brings about the appearance of a voltage between the second terminal 60 and the first contact 65, and therefore between the sources of the two transistors 35, 40. The sign of the voltage depends on the direction of the current at the time of the switching.

In the generation step 220, one of the electrical signals for controlling the transistors 35, 40, at least, is generated by the electric arc.

In particular, since the source of each transistor 35, 40 is connected to one of the terminals 55 and 60, and the gate of each transistor 35, 40 is connected to the other terminal 55, 60 by the diode 95 and the first ohmic conductor 100, the voltage appearing between these terminals 55, 60 brings about the appearance of a voltage between the source and the gate of one of the transistors. This voltage has the appropriate sign to bring about pinching of the channel of the transistor 35, 40 due to the presence of the diode 95, which is in the conducting state only for the transistor 35, 40 that is connected in the appropriate direction to switch the current.

In the switching step 230, the voltage appearing between the source and the gate of one of the transistors 35, 40 brings about pinching of the channel of this transistor 35, 40, and therefore brings about the switching of the current by said transistor 35, 40.

The switching of the current by the transistor 35, 40 furthermore brings about the extinguishing of the electric arc.

By virtue of the invention, the current is switched very quickly by the transistors 35, 40, without giving the electric arc time to develop, thereby limiting wear on the elements 45 and 50. Furthermore, the elements 45 and 50 do not have to withstand the entire switching operation and are therefore able to be dimensioned less restrictively than if this were the case.

Furthermore, the switching is performed by the transistors 35, 40 even in the absence of any electrical power source, for example because the control module 20 is purely mechanical. In particular, the switching performed by the transistors 35, 40 does not require an electronic control module 20, which may take a long time to be activated following a power supply interruption.

As long as the control module 20 is able to actuate the first contact 65 (for example by using a magnetothermal detection module 115), the signal for switching the transistors 35, 40 is generated.

Thus, even if an electronic part of the control module 20, for example used to directly command the switching of the transistors 35, 40 if needed, is not active (in particular if it is in the process of being initialized after switching of a current and an operator forces the closure of the members 45 and 50 via the lever 120), the mechanical part of the control module 20 is enough to actuate the first contact 65 and then drive the switching of the transistors 35, 40.

Furthermore, the JFETs 35, 40 tend to saturate and thus limit the strength of the current flowing through them when this current strength is very high, for example in the event of a short circuit, and therefore thus participate in protecting the network even before they are switched.

Electrically connecting the gate of each transistor 35, 40 to a respective terminal 55, 60 makes it possible to easily generate the electrical signal for switching this transistor 35, 40 when the electric arc appears and the direction of the current is appropriate.

The use of the diode 95 makes it possible to avoid subjecting the gate of the transistors 35, 40 to a voltage in the presence of an electric arc if the direction of the current is such that the sign of the voltage does not allow the current to be switched by this transistor 35, 40.

The resistor 100 makes it possible to limit the current in the diode 95 when a voltage appears across the terminals of the switching member 45 and thus to avoid damaging it in the event of the occurrence of an electric arc that is more intense than expected.

The ohmic conductor 110 makes it possible to ensure that the gate of the transistor 35, 40 is discharged when the switching member 45 is closed.

The invention is particularly useful when a member 120 allows an operator to control, in particular to close, the switching member 45, as mentioned above.

A magnetothermal detection module 115 makes it possible to command the opening of the switching member 45 even in the absence of any electrical power supply, and the invention is therefore particularly beneficial in combination with this type of detection module 115, since the switching device 10 is then able to operate without any electrical power supply.

The presence of the disconnector 50 makes it possible to ensure galvanic isolation between the input 1 and the output 2, which the switching member 45 does not allow due to the presence of the circuits 30.

Figure 3:
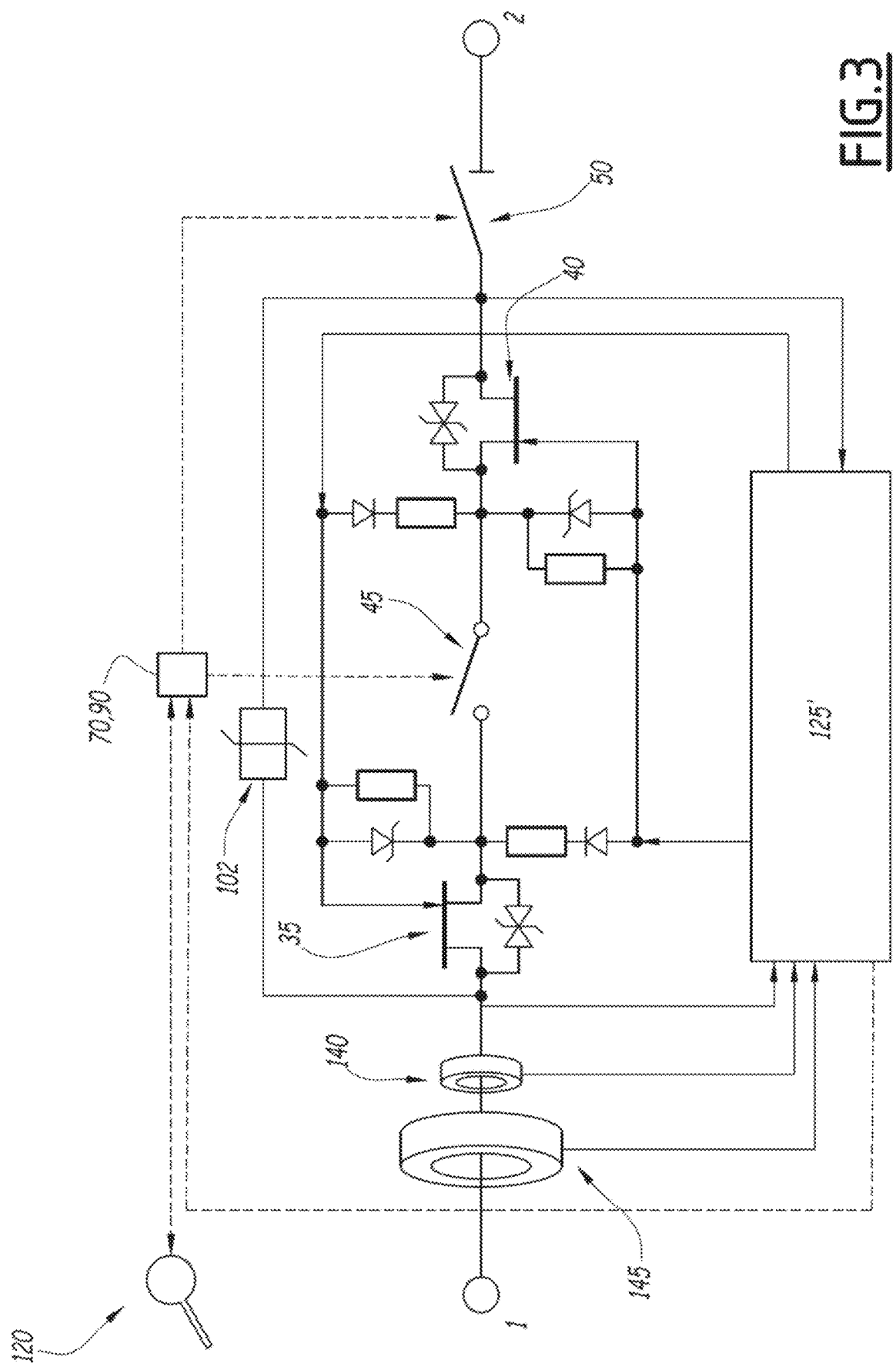
FIG. 3 is a schematic depiction of a second example of a switching device according to the invention.

A second example of a switching device 10 according to the invention is shown in FIG. 3 and will now be described.

Elements identical to the first example are not described again. Only the differences are highlighted.

The switching module 20 comprises a current sensor 140 and a main power supply 145, and does not have a separate detection module 115.

The current sensor 140 is configured to measure values of the strength of the current flowing between the input 1 and the output 2, and to transmit the measured values to a generation module 125', which takes on a role analogous or similar to the generation module 125 described above.

The current sensor 140 is for example a torus, in particular a Rogowski coil, surrounding an electrical conductor of the first circuit 25 and generating, at output, a voltage dependent on the strength of the current. However, other types of current sensor are conceivable.

The main power supply 145 is configured, based on the current flowing between the input 1 and the output 2, to generate an electric supply current for the generation module 125'.

The generation module 125' is an electronic generation module.

In particular, the generation module 125' is configured to detect the occurrence of a fault based on current values measured by the current sensor 140, and to generate the one or more corresponding switching signals.

As a variant or in addition, the generation module 125' is furthermore configured to command the switching of at least one of the transistors 35, 40 in the event of a fault being detected, for example by transmitting a corresponding third electrical switching signal to the gate of each of the transistors 35, 40.

The generation module 125' is for example formed by a processor and a memory storing a set of software instructions, the software instructions leading to the implementation of the switching method when they are implemented on the processor.

As a variant, the generation module 125' is formed by a set of programmable logic components, by one or more dedicated circuits, in particular one or more integrated circuits, or by any assembly of electrical or electronic components.

According to some embodiments, the generation module 125' has a communication module for allowing remote control by an external device.

The generation module 125' is in particular configured to transmit each first or second switching signal, in the form for example of an electrical switching signal, to the actuators 70, 90 in the event of an electrical fault being detected.

The generation module 125' is furthermore configured to generate a third electrical switching signal intended for one or more transistors 35, 40, in particular all of the transistors 35, 40, in the event of an electrical fault.

The third switching signal consists in particular in applying a voltage between the source and the gate of each transistor 35, 40, this voltage being able to drive the pinching of the channel of the transistor 35, 40 and therefore the switching of the current by this transistor 35, 40.

The control member 120 is configured to act directly on the actuators 70, 90 so as to command the switching of the first contact 65 and, optionally, of the second contact 85, without involving the generation module 125.

The operation of the second example is similar to the operation of the first example.

The use of an electronic control module 20 makes it possible to command the switching of the transistors 35, 40 before the electric arc occurs, and therefore more quickly than the first example.

Figure 4:
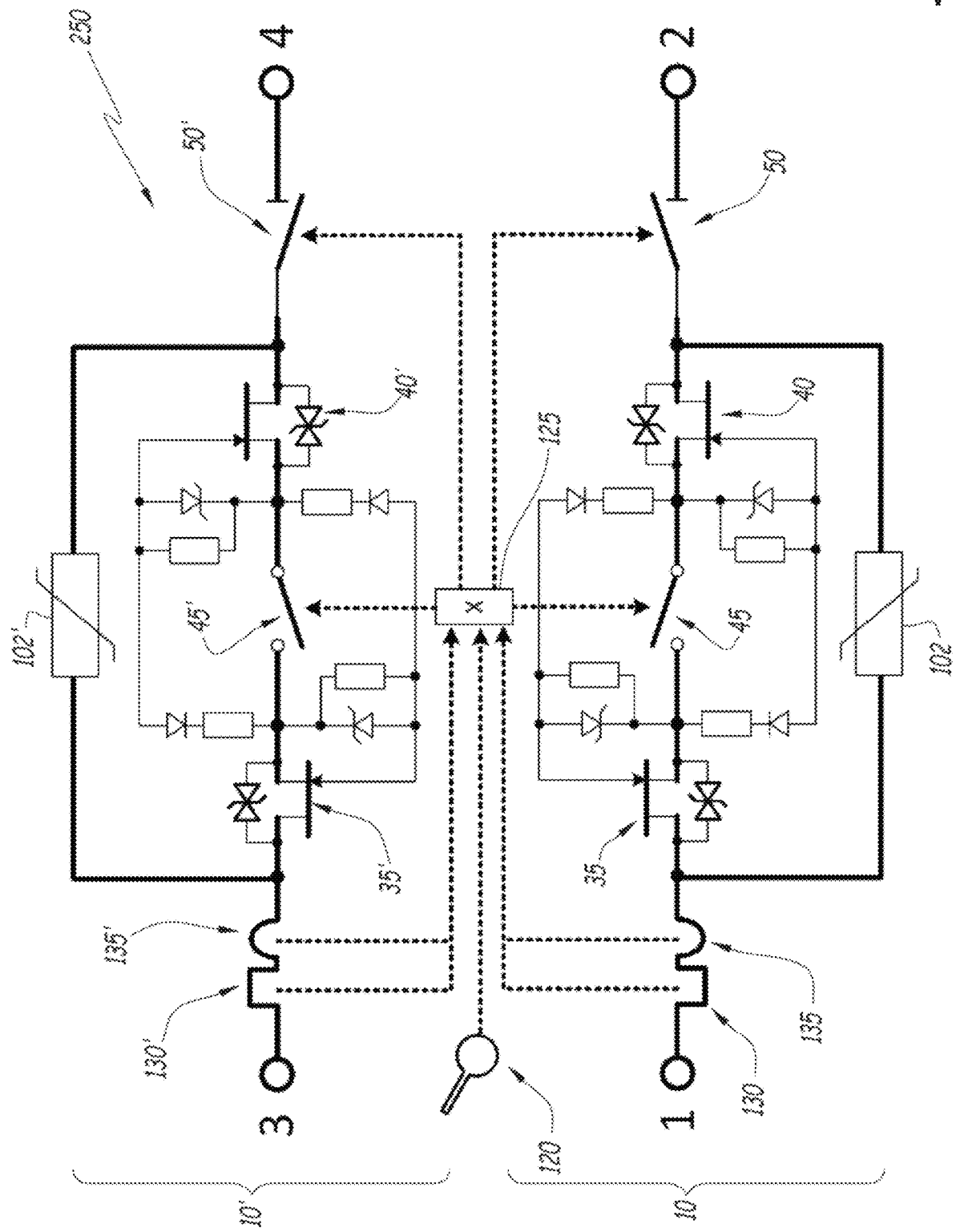
FIG. 4 is a schematic depiction of a switching system comprising multiple switching devices according to the invention.

FIG. 4 illustrates a switching system 250 configured to transmit a plurality of currents between respective inputs 1, 3 and outputs 2, 4, to detect an electrical fault relating to at least one of said currents, and to interrupt at least the corresponding current in the event of an electrical fault being detected. This switching system 250 comprises a plurality of switching devices analogous to the switching device 10 or to its variants.

In the illustrated example, the switching system 250 comprises two such switching devices: a first switching device 10 connected between the input 1 and the output 2, and a second switching twice 10' connected between the input 3 and the output 4. The two switching devices 10 and 10' are connected to one and the same generation module 125 coupled to the control member 120.

The second switching device 10' is analogous or even identical to the first switching device 10 and takes on the same role as said first switching device.

The components of the second switching device 10' denoted in FIG. 4 that are identical or similar to those of the first switching device 10 bear the same reference numerals as those of the first switching device 10, these reference numerals having the character ' added to them.

Other embodiments may be constructed, with a higher number of switching devices, for example to protect a multiphase installation, for example in a three-phase network.

Figure 5:
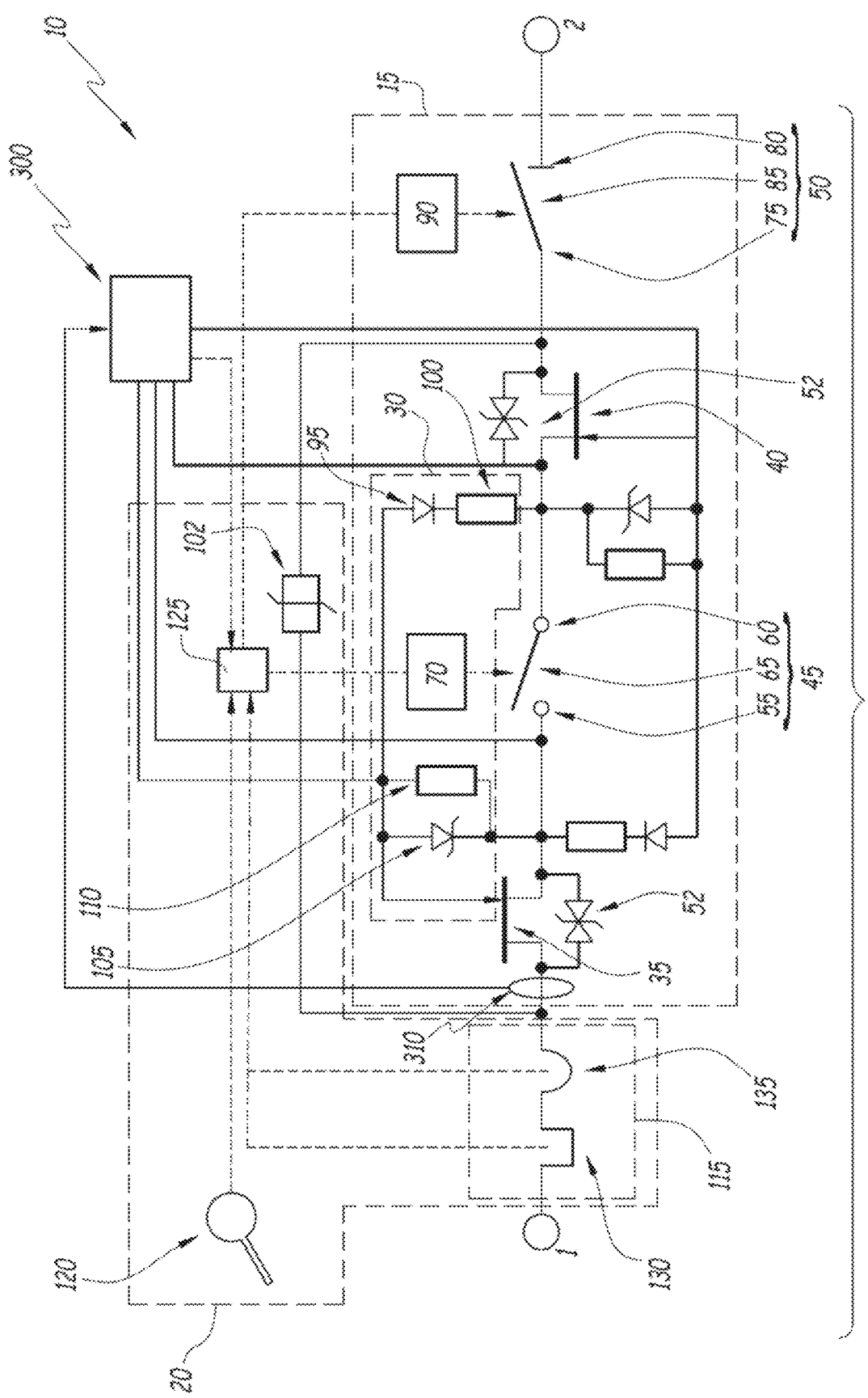
FIG. 5 is a schematic depiction of a variant of the first example of the switching device according to the invention.

FIG. 5 shows a variant of the switching device described in FIG. 1.

In this variant, the protection device 10 advantageously comprises an auxiliary control circuit 300 that makes it possible to command the JFET transistors 35, 40 directly so as to be able to provide faster protection in the event of a short circuit (that is to say with time constants of the order of around 10 μs to 1 ms).

This auxiliary control module 300 is provided so as to complement the generation module 125 and is used only to drive the transistors in the event that the module 125 takes too much time to drive the JFET transistors 35, 40.

The electrical energy needed by the auxiliary control circuit 300 to command the JFET transistors 35, 40 is advantageously taken from a current transformer 310 configured to supply the JFET control voltage by transforming the current derivative into a voltage that is applied to the control electrodes of the JFET transistors 35, 40 (for example, between the gate and the source of these transistors). According to some embodiments, the current transformer 310 has a ferromagnetic torus and a secondary winding. According to other embodiments, the current transformer 310 may be replaced with a piezoelectric transformer.

Figure 7:
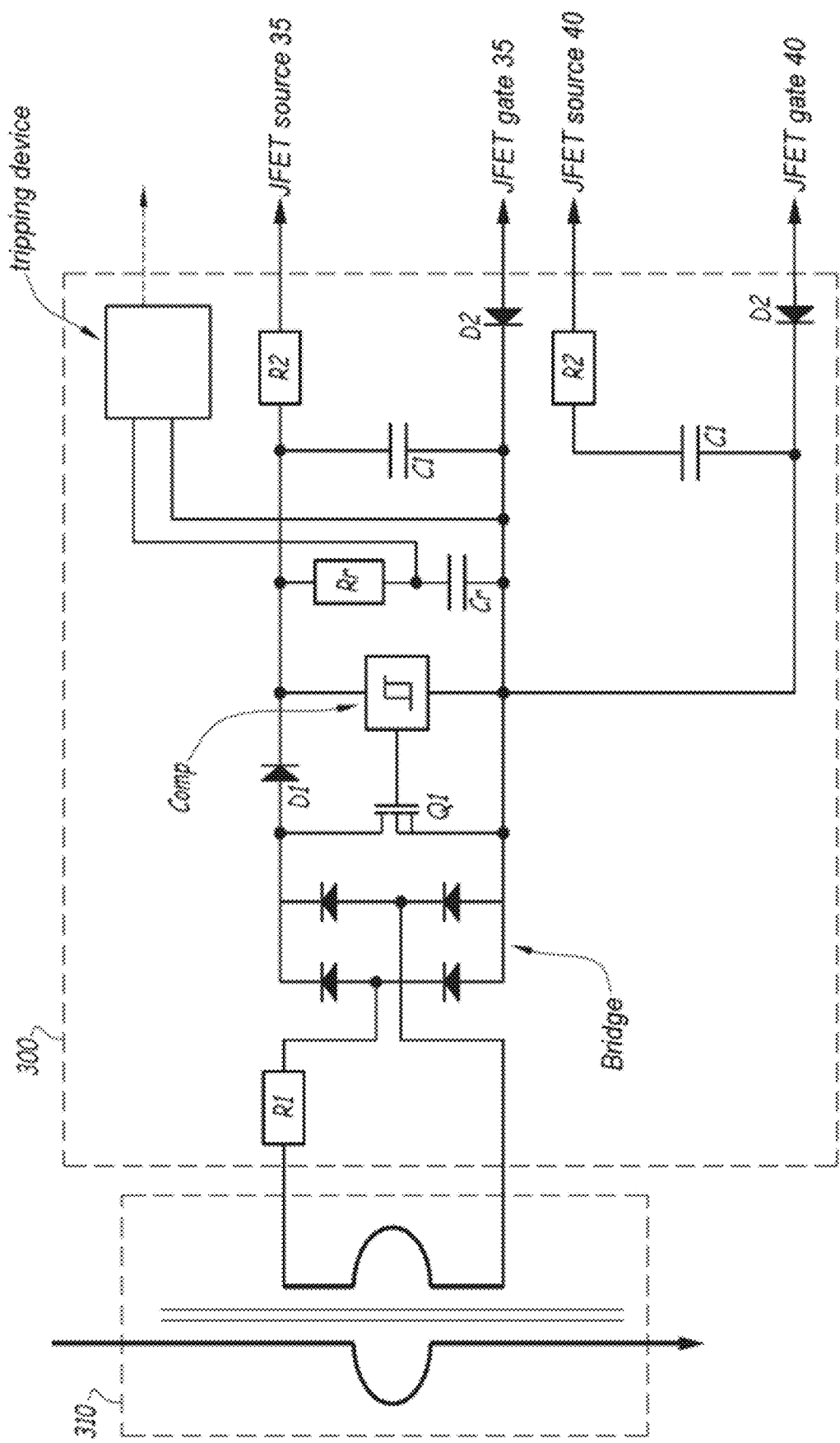
FIG. 7 is a schematic depiction of an auxiliary control circuit for the switching system from FIG. 5 or 6.

In one possible embodiment, for example illustrated by FIG. 7, the secondary voltage is rectified by a diode bridge (denoted "Bridge" in FIG. 7), and then the rectified voltage is stored in a capacitor C1 the charge of which is limited by a resistor R1. This voltage is limited by a low-voltage MOSFET device associated with a diode and a hysteresis comparator (denoted "Comp" in FIG. 7), so as not to damage the JFET transistor 35, 40. A diode D2 and a resistor R2 make it possible to interconnect this device with the JFET transistors 35, 40 without interfering with the rest of the system.

The position of this current transformer 310, which is connected to an electrical supply input of the auxiliary control circuit 300, may be located anywhere on the current flow. In one preferred embodiment, the transformer 310 is located on the side of the coil 135 or of the torus 145 (if such a torus is present).

Figure 6:
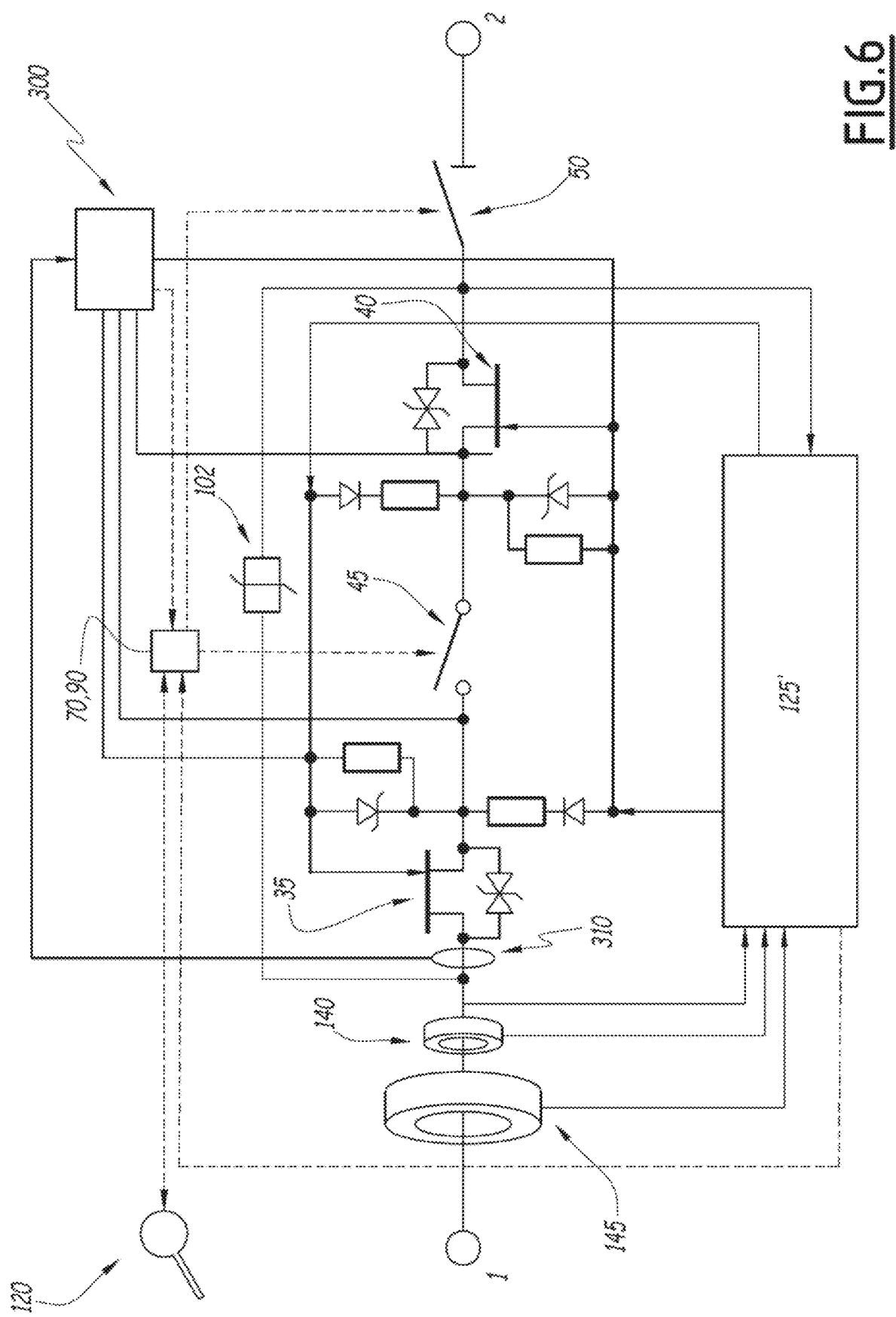
FIG. 6 is a schematic depiction of a variant of the second example of the switching device according to the invention.

FIG. 6 shows a variant of the protection device illustrated in FIG. 3, into which an auxiliary control circuit 300 as described above has been integrated.

In both variants, the operation of the auxiliary control circuit 300 is similar or even identical.

For example, once the capacitor C1 has been charged, the JFET transistors 35, 40 will interrupt the current until the capacitor C1 discharges. If the capacitor C1 has a low capacitance, the JFET transistors 35, 40 will become conductive again very quickly. If on the other hand the capacitor C1 has a high capacitance, a long time will elapse before the current is allowed to flow again, this allowing the switching member 45 to open during this time interval on the condition that, depending on the embodiment:
- the current in the coil 135 was great enough to move the mobile element and thus activate the generation module 125, or
- the current in the torus 145 had enough energy to supply power to the device 125 or 125'.

In practice, the capacitor C1 should have a high enough capacitance that the switching member 45 opens before the JFET transistors 35 and 40 become conductive again. However, an excessively high capacitance risks delaying tripping. The value of the capacitance of the capacitor C1 is therefore chosen on a case-by-case basis depending on the characteristics of the JFET transistors 35 and 40 and of the switching element 45 by finding a compromise between these requirements.

As may be seen in the figure and as explained above, the link between the respective sources of the JFET transistors 35 and 40 is provided by the switching member 45. The resistance Rr makes it possible to charge the capacitor Cr, which will supply power to the trip relay (denoted "tripping device" in FIG. 7) and open the contacts 65, 85. The resistor Rr makes it possible to delay the charging of Cr in relation to the commands of the JFET transistors 35 and 40 so as to open the contacts only once the JFET transistors 35 and 40 are blocked in the open state.

In practice, the auxiliary control circuit 300 may be optional on the condition that the JFET transistors 35 and 40 are robust enough to withstand the short-circuit current until the switching member 45 opens, and that this short-circuit current is moreover limited by the source or by another electrical device connected in series with the protection device 10. For example, in an electrical installation comprising one or more photovoltaic generators, the short-circuit current tends to be low due to the presence of semiconductor component-based power converters. In such cases, as in others, the auxiliary control circuit 300 may effectively be omitted.

Many other embodiments are possible.

The invention claimed is:

1. An electrical protection device comprising an input, an output, a control module and a switching module capable of channelling an electric current between the input and the output, the switching module comprising a first electrical circuit connecting the input to the output, the control module being configured to detect an electrical fault and to generate a first switching signal in the event of a fault being detected,
the first circuit comprising, connected in series between the input and the output, at least two head-to-tail normally-on JFET transistors and a switching member comprising a first terminal, a second terminal, a first actuator and a first contact, the first actuator being configured to move the first contact between a first position and a second position in response to the first switching signal, the first contact channelling the current between the first terminal and the second terminal when the first contact is in the first position, the first contact being spaced from at least one of the first and second terminals when the first contact is in the second position, the switching module being configured so that, upon a switchover of the first contact from the first to the second position when the current flows between the first terminal and the second terminal, an electric arc is formed between the first contact and the second terminal, and so that the appearance of the electric arc generates an electrical signal transmitted to at least one of the at least two head-to-tail normally-on JFET transistors, the electrical signal driving the switching of said at least one of the at least two head-to-tail normally-on JFET transistors,
the electrical protection device being capable of operating without auxiliary electrical power supply, by drawing some of the electrical energy from the electric arc that appears across the terminals of the switching member,
wherein each transistor of the at least two head-to-tail normally-on JFET transistors comprises a source, a drain and a gate, the electrical signal being a voltage between the gate and the source of each transistor of the at least two head-to-tail normally-on JFET transistors, the voltage being such that a conductive channel between the source and the drain of each transistor of the at least two head-to-tail normally-on JFET transistors is pinched under the effect of the voltage,
wherein the source of each transistor of the at least two head-to-tail normally-on JFET transistors is connected to a respective terminal from among the first terminal and the second terminal, the switching module comprises, for each transistor of the at least two head-to-tail normally-on JFET transistors, a second electrical circuit configured to electrically connect the gate of a transistor of the at least two head-to-tail normally-on JFET transistors under consideration to another terminal from among the first and the second terminal of the switching member so as to generate a voltage between the gate and the source of the transistor of the at least two head-to-tail normally-on JFET transistors under consideration in the event of an electric arc,
wherein each of the second electrical circuits comprises a first ohmic conductor and a diode having a cathode and an anode, the first ohmic conductor being connected in series between the cathode and the terminal to which each of the second electrical circuits is configured to connect the gate, the anode being connected to the gate of a corresponding transistor of the at least two head-to-tail normally-on JFET transistors,
wherein each of the second electrical circuits furthermore comprises a Zener diode and a second ohmic conductor that are connected in parallel between the gate and the source of a corresponding transistor of the at least two head-to-tail normally-on JFET transistors, wherein in each of the second electrical circuits an anode of the Zener diode is connected to the gate of the corresponding transistor of the at least two head-to-tail normally-on JFET transistors.

2. The electrical protection device according to claim 1, furthermore comprising a member able to be actuated by an operator, in particular a rotary lever, so as to command switching of the first contact between the first and the second position.

3. The electrical protection device according to claim 1, wherein the first switching signal is an electrical signal.

4. The electrical protection device according to claim 1, wherein the control module comprises a magnetothermal detection module configured to detect a fault and to command the generation of each switching signal in response to the detection.

5. The electrical protection device according to claim 1, wherein the first circuit furthermore comprises a disconnector connected in series with the at least two head-to-tail normally-on JFET transistors and with the switching member, the disconnector comprising a third terminal, a fourth terminal, a second contact, a second actuator, the second contact being able to move between a third position and a fourth position, the second contact channelling the current between the third terminal and the fourth terminal when the second contact is in the third position, the second contact being spaced from at least one of the third and fourth terminals when the second contact is in the fourth position, the second actuator being configured to move the second contact between the third position and the fourth position in response to a second switching signal generated by the control module in the event of a fault being detected.

6. The electrical protection device according to claim 5, comprising a member able to be actuated by an operator, in particular a rotary lever, so as to command switching of the second contact between the third position and the fourth position.

7. The electrical protection device according to claim 1, wherein the electrical protection device is capable of drawing some of the electrical energy from the electric arc that appears across the terminals of the switching member to control the first electrical circuit and therefore switch the at least two head-to-tail normally-on JFET transistors.

8. A switching system configured to transmit a plurality of currents between respective inputs and outputs, to detect an electrical fault relating to at least one of the plurality of currents, and to interrupt at least the corresponding current in the event of an electrical fault being detected, comprising a plurality of electrical protection devices according to claim 1.

9. A method for switching a switching an electrical protection device as recited in claim 1,
the method comprising, in the switching module:
switching the first contact from the first to the second position when the current flows between the first terminal and the second terminal,
the appearance of an electric arc between the first contact and the second terminal,
generating, using the electric arc, an electrical signal that is transmitted to at least one of the at least two head-to-tail normally-on JFET transistors, and
switching at least one of the at least two head-to-tail normally-on JFET transistors in response to the receipt of the electrical signal.

10. An electrical protection device comprising an input, an output, a control module and a switching module capable of channelling an electric current between the input and the output, the switching module comprising a first electrical circuit connecting the input to the output, the control module being configured to detect an electrical fault and to generate a first switching signal in the event of a fault being detected,
the first circuit comprising, connected in series between the input and the output, at least two head-to-tail normally-on JFET transistors and a switching member comprising a first terminal, a second terminal, a first actuator and a first contact, the first actuator being configured to move the first contact between a first position and a second position in response to the first switching signal, the first contact channelling the current between the first terminal and the second terminal when the first contact is in the first position, the first contact being spaced from at least one of the first and second terminals when the first contact is in the second position,
the switching module being configured so that, upon a switchover of the first contact from the first to the second position when the current flows between the first terminal and the second terminal, an electric arc is formed between the first contact and the second terminal, and so that the appearance of the electric arc generates an electrical signal transmitted to at least one of the at least two head-to-tail normally-on JFET transistors, the electrical signal driving the switching of said at least one of the at least two head-to-tail normally-on JFET transistors,
the electrical protection device being capable of operating without auxiliary electrical power supply, by drawing some of the electrical energy from the electric arc that appears across the terminals of the switching member, wherein the control module is configured, in the event of a fault being detected, to generate at least one third electrical switching signal able to drive switching of a corresponding transistor of the at least two head-to-tail normally-on JFET transistors.

11. The electrical protection device according to claim 10, wherein the control module comprises a power supply configured, based on the current flowing between the input and the output, to generate an electrical supply current for a generation module, the generation module being configured, in the event of a fault being detected, to generate at least the third electrical switching signal.

12. An electrical protection device comprising an input, an output, a control module and a switching module capable of channelling an electric current between the input and the output, the switching module comprising a first electrical circuit connecting the input to the output, the control module being configured to detect an electrical fault and to generate a first switching signal in the event of a fault being detected,
the first circuit comprising, connected in series between the input and the output, at least two head-to-tail normally-on JFET transistors and a switching member comprising a first terminal, a second terminal, a first actuator and a first contact, the first actuator being configured to move the first contact between a first position and a second position in response to the first switching signal, the first contact channelling the current between the first terminal and the second terminal when the first contact is in the first position, the first contact being spaced from at least one of the first and second terminals when the first contact is in the second position,
the switching module being configured so that, upon a switchover of the first contact from the first to the second position when the current flows between the first terminal and the second terminal, an electric arc is formed between the first contact and the second terminal, and so that the appearance of the electric arc generates an electrical signal transmitted to at least one of the at least two head-to-tail normally-on JFET transistors, the electrical signal driving the switching of said at least one of the at least two head-to-tail normally-on JFET transistors, the electrical protection device being capable of operating without auxiliary electrical power supply, by drawing some of the electrical energy from the electric arc that appears across the terminals of the switching member, comprising an auxiliary control circuit supplied with power by a power supply that is configured to draw some of the energy from the electric current flowing between the input and the output, the auxiliary control circuit being configured, in the event of a short-circuit fault with the energy taken from the power supply being detected, to generate a fourth signal able to drive switching of the at least two head-to-tail normally-on JFET transistors.

13. The electrical protection device according to claim 12, wherein the power supply of the auxiliary control circuit comprises a current transformer.

* * * * *